United States Patent
Chang et al.

(10) Patent No.: US 9,201,704 B2
(45) Date of Patent: Dec. 1, 2015

(54) SYSTEM AND METHOD FOR MIGRATING APPLICATION VIRTUAL MACHINES IN A NETWORK ENVIRONMENT

(75) Inventors: David Wei-Shen Chang, Milpitas, CA (US); Abhijit Patra, Saratoga, CA (US); Nagaraj A. Bagepalli, Fremont, CA (US); Murali Anantha, Sunnyvale, CA (US); Jason Zhen Zhang, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 13/440,735

(22) Filed: Apr. 5, 2012

(65) Prior Publication Data

US 2013/0268643 A1    Oct. 10, 2013

(51) Int. Cl.
  *G06F 15/16* (2006.01)
  *G06F 15/177* (2006.01)
  *G06F 9/50* (2006.01)
  *G06F 9/455* (2006.01)
  *G06F 9/48* (2006.01)

(52) U.S. Cl.
  CPC .......... *G06F 9/5077* (2013.01); *G06F 9/45558* (2013.01); *G06F 9/4856* (2013.01); *G06F 9/5072* (2013.01); *G06F 2009/4557* (2013.01)

(58) Field of Classification Search
  CPC ............ H04L 63/0272; H04L 12/4625; H04L 12/4633; H04L 63/164; H04L 12/462; H04L 12/4641; H04L 63/0227; G06F 9/5077; G06F 9/5072; G06F 9/45558; G06F 9/4856; G06F 2009/4557
  USPC .......................... 709/220–222, 238, 249, 250
  See application file for complete search history.

(56) References Cited

U.S. PATENT DOCUMENTS

| 7,277,948 B2 | 10/2007 | Igarashi et al. |
| 8,234,377 B2 * | 7/2012 | Cohn ........................... 709/225 |
| 8,296,434 B1 | 10/2012 | Miller et al. |

(Continued)

FOREIGN PATENT DOCUMENTS

| EP | 2228719 | 9/2010 |
| EP | 2439637 | 4/2012 |

OTHER PUBLICATIONS

Borovick, Lucinda, et al., "Architecting the Network for the Cloud," IDC White Paper, Jan. 2011, 8 pages.

(Continued)

*Primary Examiner* — Edward Kim
(74) *Attorney, Agent, or Firm* — Patent Capital Group

(57) ABSTRACT

A method includes managing a virtual machine (VM) in a cloud extension, where the VM is part of a distributed virtual switch (DVS) of an enterprise network, abstracting an interface that is transparent to a cloud infrastructure of the cloud extension, and intercepting network traffic from the VM, where the VM can communicate securely with the enterprise network. The cloud extension comprises a nested VM container (NVC) that includes an emulator configured to enable abstracting the interface, and dual transmission control protocol/Internet Protocol stacks for supporting a first routing domain for communication with the cloud extension, and a second routing domain for communication with the enterprise network. The NVC may be agnostic with respect to operating systems running on the VM. The method further includes migrating the VM from the enterprise network to the cloud extension through suitable methods.

20 Claims, 6 Drawing Sheets

(56) References Cited

U.S. PATENT DOCUMENTS

| | | | |
|---|---|---|---|
| 8,301,746 B2 | 10/2012 | Head et al. | |
| 8,345,692 B2* | 1/2013 | Smith | 370/396 |
| 8,495,356 B2 | 7/2013 | Ashok et al. | |
| 8,514,868 B2 | 8/2013 | Hill | |
| 8,532,108 B2* | 9/2013 | Li et al. | 370/392 |
| 8,560,663 B2 | 10/2013 | Baucke et al. | |
| 8,660,129 B1 | 2/2014 | Brendel et al. | |
| 8,719,804 B2 | 5/2014 | Jain | |
| 8,805,951 B1 | 8/2014 | Faibish et al. | |
| 8,856,339 B2 | 10/2014 | Mestery et al. | |
| 8,909,928 B2 | 12/2014 | Ahmad et al. | |
| 8,918,510 B2 | 12/2014 | Gmach et al. | |
| 8,924,720 B2 | 12/2014 | Raghuram et al. | |
| 8,930,747 B2 | 1/2015 | Levijarvi et al. | |
| 8,931,038 B2 | 1/2015 | Pulier et al. | |
| 2008/0049786 A1 | 2/2008 | Ram et al. | |
| 2009/0323706 A1* | 12/2009 | Germain et al. | 370/401 |
| 2010/0318609 A1 | 12/2010 | Lahiri et al. | |
| 2011/0075667 A1* | 3/2011 | Li et al. | 370/392 |
| 2011/0173303 A1* | 7/2011 | Rider | 709/220 |
| 2011/0231899 A1 | 9/2011 | Pulier et al. | |
| 2011/0239039 A1 | 9/2011 | Dieffenbach et al. | |
| 2011/0255538 A1 | 10/2011 | Srinivasan et al. | |
| 2011/0261828 A1* | 10/2011 | Smith | 370/401 |
| 2011/0276675 A1 | 11/2011 | Singh et al. | |
| 2011/0276951 A1 | 11/2011 | Jain | |
| 2012/0054367 A1 | 3/2012 | Ramakrishnan et al. | |
| 2012/0072578 A1 | 3/2012 | Alam | |
| 2012/0072985 A1 | 3/2012 | Davne et al. | |
| 2012/0084445 A1 | 4/2012 | Brock et al. | |
| 2012/0084782 A1* | 4/2012 | Chou et al. | 718/102 |
| 2012/0096134 A1* | 4/2012 | Suit | 709/221 |
| 2012/0131174 A1 | 5/2012 | Ferris et al. | |
| 2012/0167094 A1 | 6/2012 | Suit | |
| 2012/0179909 A1* | 7/2012 | Sagi et al. | 713/167 |
| 2012/0222084 A1 | 8/2012 | Beaty et al. | |
| 2012/0265976 A1 | 10/2012 | Spiers et al. | |
| 2012/0281706 A1* | 11/2012 | Agarwal et al. | 370/395.53 |
| 2012/0311106 A1* | 12/2012 | Morgan | 709/220 |
| 2012/0311568 A1 | 12/2012 | Jansen | |
| 2012/0324114 A1 | 12/2012 | Dutta et al. | |
| 2013/0036213 A1* | 2/2013 | Hasan et al. | 709/223 |
| 2013/0111540 A1* | 5/2013 | Sabin | 726/1 |
| 2013/0138816 A1 | 5/2013 | Kuo et al. | |
| 2013/0152076 A1 | 6/2013 | Patel | |
| 2013/0152175 A1 | 6/2013 | Hromoko et al. | |
| 2013/0179941 A1 | 7/2013 | McGloin et al. | |
| 2013/0182712 A1 | 7/2013 | Aguayo et al. | |
| 2013/0185433 A1 | 7/2013 | Zhu et al. | |
| 2013/0191106 A1 | 7/2013 | Kephart et al. | |
| 2013/0268588 A1 | 10/2013 | Chang | |
| 2013/0268799 A1 | 10/2013 | Mestery et al. | |
| 2013/0283364 A1 | 10/2013 | Chang et al. | |
| 2013/0297769 A1 | 11/2013 | Chang et al. | |
| 2014/0040473 A1 | 2/2014 | Ho et al. | |
| 2014/0040883 A1 | 2/2014 | Tompkins | |
| 2014/0156557 A1 | 6/2014 | Zeng et al. | |
| 2014/0222953 A1 | 8/2014 | Karve et al. | |
| 2014/0366155 A1 | 12/2014 | Chang et al. | |

OTHER PUBLICATIONS

"Best Practices in Deploying Cisco Nexus 1000V Series Switches on Cisco UCS B and C Series Cisco UCS Manager Servers," Cisco White Paper, Cisco Systems, Inc., Apr. 2011; 36 pages http://www.cisco.com/en/US/prod/collateral/switches/ps9441/ps9902/white_paper_c11-558242.pdf; 36 pages.

"Cisco Unified Network Services: Overcome Obstacles to Cloud-Ready Deployments," Cisco White Paper, Cisco Systems, Inc., Jan. 2011; 6 pages.

"Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008; 10 pages.

USPTO Feb. 20, 2014 Non-Final Office Action from U.S. Appl. No. 13/454,528.

USPTO Mar. 14, 2014 Non-Final Office Action from U.S. Appl. No. 13/438,861.

U.S. Appl. No. 14/058,041, filed Oct. 18, 2013, entitled "Method and System of Providing Storage Services in Multiple Public Clouds," Inventors: David Wei-Shen Chang et al.

USPTO Sep. 10, 2014 Final Office Action from U.S. Appl. No. 13/454,528.

USPTO Sep. 19, 2014 Final Office Action from U.S. Appl. No. 13/438,861.

USPTO Feb. 26, 2015 Non-Final Office Action from U.S. Appl. No. 13/454,528.

Linthicum, David, "VM Import could be a game changer for hybrid clouds," InfoWorld, Dec. 23, 2010.

"Open Data Center Alliance Usage: Virtual Machine (VM) Interoperability in a Hybrid Cloud Environment Rev 1.2.2013," Open Data Center Alliance, Inc.

USPTO Jun. 17, 2015 Non-Final Office Action from U.S. Appl. No. 13/438,861.

USPTO Jul. 29, 2015 Notice of Allowance from U.S. Appl. No. 13/454,528.

* cited by examiner

SYSTEM AND METHOD FOR MIGRATING APPLICATION VIRTUAL MACHINES IN A NETWORK ENVIRONMENT

TECHNICAL FIELD

This disclosure relates in general to the field of communications and, more particularly, to a system and a method for migrating application virtual machines in a network environment.

BACKGROUND

A trend towards virtualization in the information technology (IT) arena is driving the development of many virtualization technologies, such as network virtualization. Network virtualization solutions can consolidate multiple physical networks into one virtual network. They can also logically segment a single physical network into multiple logical networks. Partitions can be added to rapidly scale the network for business needs. Network virtualization represents a new IT paradigm, challenging existing physical network deployment models. Network virtualization offers many benefits, such as expanding the availability of single IT assets to multiple users, managing multiple IT assets as a single resource, providing dedicated virtual networks for applications, etc. This can lead to revenue generation, expense reduction, and customer satisfaction.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method includes managing a virtual machine (VM) in a cloud extension, abstracting an interface that is transparent to a cloud infrastructure of the cloud extension, and intercepting network traffic from the VM, where the VM can communicate securely with an enterprise network. The VM may be part of a distributed virtual switch (DVS) of the enterprise network. In a specific embodiment, the method may further include providing a secure tunnel between the VM and a cloud gateway located in the cloud extension. In other specific embodiments, managing the VM may include launching the VM, starting the VM, stopping the VM, restarting the VM, monitoring health of the VM, providing resource utilization data associated with the VM, and providing console access to the VM.

In other embodiments, the method may also include migrating the VM from the enterprise network to the cloud extension. The migrating may include establishing, at the enterprise network, a secure tunnel with the cloud extension, transferring files associated with the VM to be migrated from the enterprise network to an agent process running in the cloud extension, and configuring the VM in the cloud extension. Other embodiments may include intercepting data from the VM, relaying the data to a cloud storage in the cloud extension, applying an encryption function to the data, and writing the encrypted data to the cloud storage. More specific embodiments may include decrypting the encrypted data in response to a read request from the VM.

In specific embodiments, the cloud extension can comprise a nested VM container (NVC) that includes an emulator configured to enable abstracting the interface and running the VM, and dual transmission control protocol/Internet Protocol stacks for supporting a first routing domain for communication with the cloud extension, and a second routing domain for communication with the enterprise network. In more specific embodiments, the NVC may be agnostic to operating systems running on the VM. In other more specific embodiments, the NVC may be agnostic to a hypervisor on which the VM was previously hosted (for example, in the enterprise network).

In other embodiments, the method may further include storing a VM image of the VM in a cloud storage in the cloud extension, such that the cloud storage is accessible from outside the NVC, shutting down the VM in the NVC, providing an additional NVC with different processing resources at the cloud extension, instantiating the additional NVC, mounting the cloud storage to the additional NVC, and re-launching the VM on the additional NVC.

Example Embodiments

Figure 1:
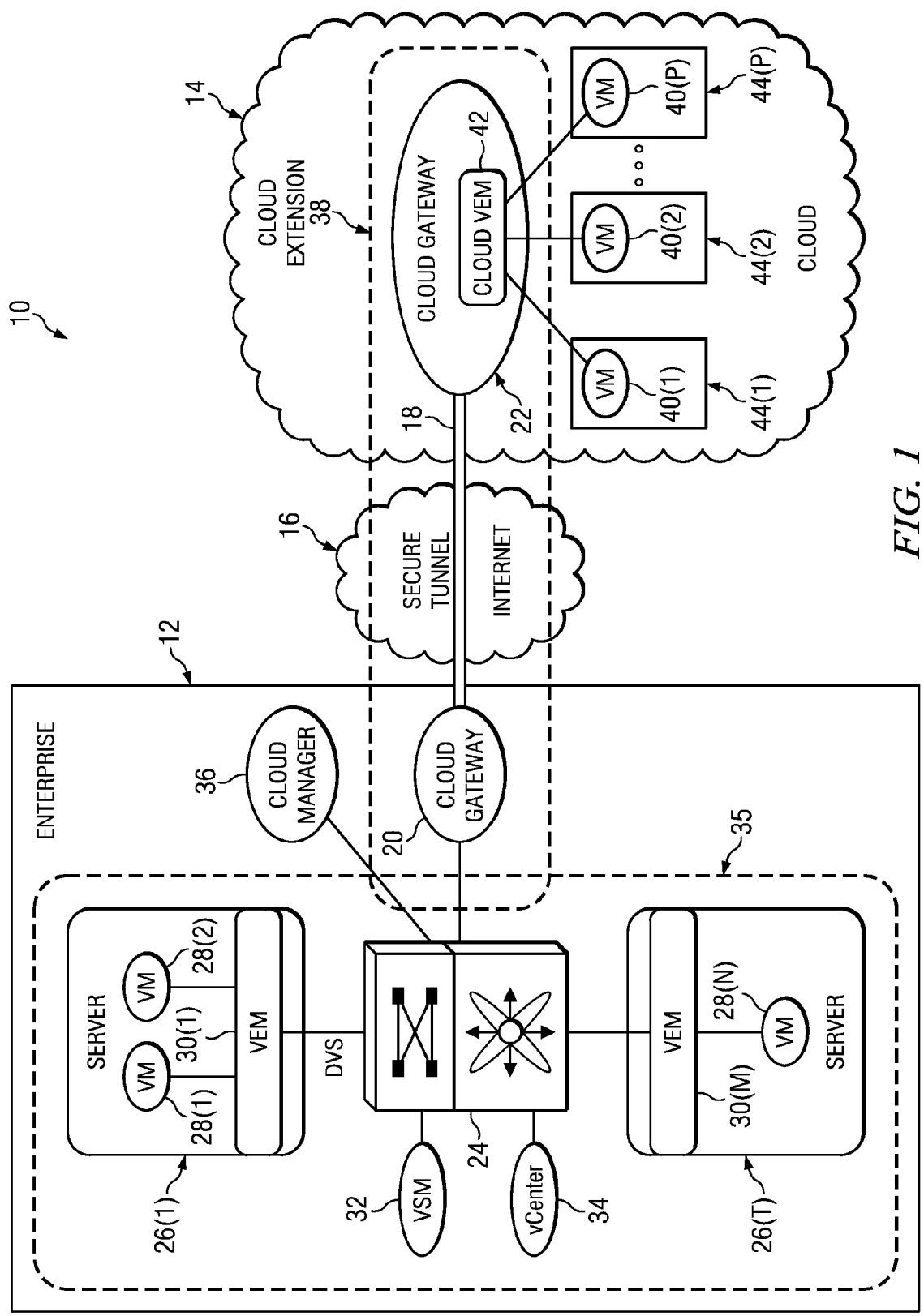
FIG. 1 is a simplified block diagram illustrating a system for migrating application virtual machines in a network environment.

Turning to FIG. 1, FIG. 1 is a simplified block diagram illustrating a communication system 10 for migrating application virtual machines in a network environment in accordance with one example embodiment. FIG. 1 illustrates an enterprise network 12 in communication with a cloud extension 14 over a public network, such as an Internet 16, via a secure tunnel 18. Secure tunnel 18 may connect a cloud gateway 20 in enterprise network 12 with a corresponding cloud gateway 22 in cloud extension 14. Cloud gateway 20 in enterprise network 12 may communicate with one or more distributed virtual switches (DVS) 24. DVS 24 may span many servers 26(1)-26(T), functioning as a single virtual switch across all associated hosts in enterprise network 12. Servers 26(1)-26(T) may host virtual machines (VMs) 28(1)-28(N), enabled by one or more Virtual Ethernet Modules (VEMs) 30(1)-30(M). For example, server 26(1) may be provisioned with VEM 30(1) that provides network capability to VMs 28(1) and 28(2); server 26(T) may be provisioned with VEM 30(M) that provides networking capability to VM 28(N).

DVS 24 may be provisioned with a Virtual Supervisor Module (VSM) 32 that controls VEMs 30(1)-30(M) as one virtual switch. VEMs 30(1)-30(M) may be configured through VSM 32 to perform Layer 2 switching and advanced networking functions, such as port-channels, quality of service (QoS), security (e.g., private virtual local area network (VLAN), port security, etc.), and monitoring (e.g., Netflow, switch port analyzer (SPAN), encapsulated remote SPAN, etc.). Network administrators can define configurations on all VEMs 30(1)-30(M) in enterprise network 12 from a single interface vCenter 34 coupled to VSM 32. In the embodiment, vCenter 34 may be integrated with a server (not shown) that provides a single console to operate and manage VSM 32. Together, DVS 24, VMs 28(1)-28(N), VEMs 30(1)-30(M), VSM 32 and vCenter 34 may form one or more virtual networks 35.

According to embodiments of the present disclosure, enterprise network 12 and cloud extension 14 may form a hybrid cloud network environment. Enterprise network 12 may be any private network, such as a data center network, operated and controlled by a single entity or organization. Cloud extension 14 is a collection of hardware and software ("cloud infrastructure") forming a shared pool of configurable computing resources (e.g., networks, servers, storage, applications, services, etc.) that can be suitably provisioned to provide on-demand self-service, network access, resource pooling, elasticity and measured service, among other features. In various embodiments, cloud extension 14 may be deployed as a private cloud (e.g., infrastructure operated by a single enterprise/organization), community cloud (e.g., infrastructure shared by several organizations to support a specific community that has shared concerns), public cloud (e.g., infrastructure made available to the general public), or a suitable combination of two or more disparate types of clouds.

Cloud extension 14 may be managed by a cloud service provider, who can provide enterprise network 12 with access to cloud extension 14 and authorization to set up secure tunnel 18 in accordance with a predetermined service level agreement (SLA). In particular, resources (e.g., network, storage, etc.) within cloud extension 14 are not controlled by the entity or organization controlling enterprise network 12; rather, the resources are allocated to enterprise network 12 according to the SLA with the cloud service provider. For example, enterprise network 12 may be signed up for using a fixed amount of Central Processing Unit (CPU) processors, storage, and network services. Moreover, cloud extension 14 may provide a single operating system (e.g., Linux) across all its servers, utilizing a particular hypervisor (e.g., Xen), without regard for compatibility with operating systems or hypervisors of VMs 28(1)-28(N) in enterprise network 12.

In various embodiments, a cloud manager 36 may provide a management platform (e.g., through a VM) running in enterprise network 12. For example, cloud manager 36 may facilitate hybrid cloud operations in cloud extension 14, manage cloud resources in cloud extension 14 that are allocated to enterprise network 12, dynamically instantiate cloud gateways 20 and 22, and perform various other management functions through an enterprise virtualization platform (e.g., vCenter 34) and cloud provider application programming interfaces (APIs). Cloud manager 36 may also monitor health of substantially all components in virtual networks 35 and allocated resources in cloud extension 14 and provide high availability of those components based on particular needs.

DVS 24 may be extended into cloud extension 14 through a cloud VEM (cVEM) 42, which may be substantially a counterpart of VEMs 30(1)-30(M) in enterprise network 12. cVEM 42 may be embedded in cloud gateway 22 and may enable switching inter-VM traffic at cloud extension 14. Cloud gateway 22 may facilitate establishing secure tunnel 18 with allocated cloud resources according to the SLA. A plurality of VMs 40(1)-40(P) may be provisioned in cloud extension 14. cVEM 42 and VMs 40(1)-40(P) may share VSM 32 over secure tunnel 18 with VEMs 30(1)-30(M) and VMs 28(1)-28(N) in enterprise network 12.

According to embodiments of communication system 10, nested VM containers (NVCs) 44(1)-44(P) may be provisioned in cloud extension 14 to host respective VMs 40(1)-40(P). In various embodiments, NVCs 44(1)-44(P) may use emulation techniques to provide a network overlay, for example, to facilitate computing, storage and networking services for running application workloads (e.g., by VMs 40(1)-40(P)) in cloud extension 14 and connecting respective VMs 40(1)-40(P) with virtual networks 35. Such an overlay approach may provide several advantages in cloud security, cloud computing efficiency, and cloud interoperability areas over other hybrid cloud approaches.

For purposes of illustrating the techniques of communication system 10, it is important to understand the communications in a given system such as the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Until recently, data center networks were designed under the assumption that each end node was connected to an access port of a switch in the network and the end node corresponded to one server running a single instance of an operating system (OS) and a single instance of a given application. Another assumption was that the application and its associated OS would be persistently bound to that specific physical server and would rarely, if ever, move onto another physical server. In recent years, introduction of server virtualization has invalidated these assumptions and posed some new challenges for data center network designs. Server virtualization modifies both of the previously mentioned assumptions of data center network design by allowing multiple operating systems to transparently share the same physical server and input/output (I/O) devices. Local switching is used between different VMs within the same server, invalidating the assumption that each network access port corresponds to a single physical server running a single instance of an OS. Moreover, by abstracting hardware from software, virtualization effectively enables VMs to become mobile, which means that a VM can be moved from one physical server to another within the data center or even across multiple data centers or networks, including from within an enterprise network to a cloud extension.

The consequences of such level of mobility on the network are not trivial. Mobility of VMs can pose stringent requirements on the underlying network infrastructure. For example, it could require that both the source and destination hosts be part of the same set of Layer 2 domains (e.g., VLANs). Features such as port security, IEEE 802.1x, and Internet Protocol (IP) source guard that maintain state information based on the physical port may not be deployed in virtualized networks, as the VM may move at any instant. Further, as VMs move from one physical server to another, it may be desirable that all the network policies defined in the network for the VM (for example, ACLS) be consistently applied, without regard to the location of the VM in the network.

VEMs, which include virtual interfaces that maintain network configuration attributes, security, and statistics across mobility events, may be dynamically provisioned within virtualized networks based on network policies stored in the DVS as a result of VM provisioning operations by a hypervisor management layer (e.g., vCenter). VEMs could be the virtual equivalent of physical network access ports. VEMs may follow virtual network interface cards (vNICs) when VMs move from one physical server to another. The movement can be performed while maintaining port configuration and state, including NetFlow, port statistics, and any Switched Port Analyzer (SPAN) session. By virtualizing the network access port with VEMs, transparent mobility of VMs across different physical servers and different physical access-layer switches within an enterprise network may be possible. However, when VMs are moved away from the enterprise network into a cloud extension, operated by an entity different from the entity that operates the enterprise network, certain issues could arise.

Enterprises may subscribe to IT capacity and applications in a cloud to extend the enterprise network based on demand and workload. In the cloud, software applications can be delivered transparently to the user (e.g., the user is effectively unaware of where the processing takes place). Additionally, virtual environments and compute capacity can be delivered as a service when business units require them, without the added cost of purchasing new hardware. Moreover, excess capacity can be easily returned to the pool of resources once it is no longer needed. However, there are at least three hurdles to adoption of cloud computing as an extension of the enterprise network: security, privacy, and compliance.

Many early cloud adapters used Open Virtual Private Network (OpenVPN) technology to create an overlay network in a cloud datacenter for connecting their cloud resources to the enterprise network. The OpenVPN approach requires users to install the OpenVPN package onto the VMs running in the cloud. Using TUN/TAP technology, OpenVPN maps a tunnel connection to a TAP instance and presents it as a network interface to the TCP/IP stack. While OpenVPN approach offers a secure network overlay in a cloud environment, it has many problems that might slow down the enterprise's plan to migrate its applications to the cloud.

For example, although offering secure transport connections in a cloud environment, OpenVPN does not provide a switch infrastructure for providing features like switching network traffic locally at the cloud, providing consistent enterprise network polices, insertion of various network services (e.g. Firewall), or constructing sophisticated network topology (e.g. systems connected through a router and multiple VLANs). Additional problems include: no support for storage overlay; no support for compute overlay; lack of efficient means to convert back to enterprise VM from cloud VM; and no routing domain transparency support. Thus, there may be no generic support for VM mobility. Customers may have to go through lengthy processes to format their VMs appropriately before they can be run at the cloud. When there is a need to move the cloud VM back to the enterprise network or to another cloud, customers may have to spend equal, if not more, effort to do the conversion again. Additional storage gateway may have to be deployed for providing data encryption features. Because OpenVPN uses the same TCP/IP stack for handling traffic in both public and private networks, IT admin may be forced to use very complex policy-based routing schemes for handling issues like per interface default gateway.

Another approach may be to use a network virtualization product (e.g., vCider) that pushes secure tunnel functions as a driver into a kernel of the VM operating in the cloud. vCider's virtual network and OpenVPN share a number of characteristics. However, whereas OpenVPN is an application that runs in user space, vCider runs in the kernel. The kernel driver approach improves secure tunnel performance to some extent. However, this approach also presents problems similar to OpenVPN. For example, dynamic overlay implementation (e.g., DMVPN) could need a registration and mapping service, which is implemented as a web service, making vCider client configuration dependent on the availability of the service web site. Additionally, vCider is not transparent to the cloud infrastructure, for example, requiring a driver to be installed in each VM. Thus, vCider could have compliance and privacy issues, similar to OpenVPN.

Moreover, when an enterprise application VM is migrated to the cloud, issues may arise in connection with incompatibility of the hypervisor hosting the VMs in the enterprise versus the hypervisor hosting the VMs in the cloud. For example, the hypervisor (e.g., vMWare™) used in the enterprise network could be different from the hypervisor (e.g., WindRiver™) used in the cloud. Sizeable effort may be needed to convert the VM from one hypervisor format to another, and many times such conversion processes are not reversible. Thus, once the VM is migrated to the cloud, it may not be possible to migrate it back to the enterprise network.

Further, many cloud service providers may not provide enterprise customers with flexible resource allocation schemes. Computing resources may have to be decided before the VM is deployed at the cloud. Once the VM is deployed, resource configuration is fixed for the VM throughout its life-cycle in the cloud. If additional processing resources, such as increased memory size and/or number of CPUs, are needed, a new VM may have to be rebuilt in the cloud.

Communication system 10 is configured to address these issues (and others) in offering a system and a method for migrating application virtual machines in a network environment. Embodiments of communication system 10 may provide for managing VMs 40(1)-40(P) in cloud extension 14, abstracting an interface that is transparent to the cloud infrastructure of cloud extension 14 and intercepting network traffic from VMs 40(1)-40(P), where VMs 40(1)-40(P) can communicate securely with enterprise network 12. VMs 40(1)-40(P) may be migrated from enterprise network 12 to cloud extension 14 by establishing secure tunnel 18, transferring files associated with VMs 40(1)-40(P) from enterprise network 12 to an agent process running in each of NVCs 44(1)-44(P) and configuring VMs 40(1)-40(P) appropriately in cloud extension 14.

As used herein, the term "interface" includes a point of interaction between software components (e.g., applications, VMs, etc.) that allows access to computer resources such as memory, CPU, and storage. Interfaces can specify routines, data structures, object classes, exceptions, method signatures, peripheral register and interrupt definitions, core peripheral functions, signal processing algorithms, etc. Interfaces can include application programming interfaces (APIs) and other languages and codes that applications use to communicate with each other and with the hardware of the computer system on which they reside. Interfaces may be specific to an operating system or hardware. For example, each operating system and/or processor may have a separate and distinct interface.

"Abstracting" the interface can include (but is not limited to) hiding implementation details of the functionalities specified by the interface. "Abstracting" can also include removing, modifying, altering, replacing, or otherwise changing certain electronic elements associated with the interface. Consider an example involving one of VMs 40(1)-40(P), denoted herein as VM 40 for purposes of explanation. In addition, for ease of explanation, the corresponding NVC hosting VM 40 is referred to herein as NVC 44. To read and write to a device (e.g., terminal, virtual network port, file, etc.) in cloud extension 14 at an application level, the application program in VM 40 may call a function (e.g., read( ) to open the device. The device's physical characteristics may be mediated by NVC 44, which in turn presents an abstract interface (via routines, functions, etc.) that allows the program to read and write bytes from/to the device through suitable commands. NVC 44 then performs the actual transformation needed to read and write the stream of bytes to the device.

NVC 44 may run on top of the cloud infrastructure and abstract the transparent interface for VM 40. In one example embodiment, NVC 44 may be a virtual appliance deployed in cloud extension 14 as a VM. For example, NVC 44 may run on a hypervisor provided by the cloud service provider. In another example embodiment, NVC 44 may be deployed as a hypervisor on an operating system provided by the cloud service provider. NVC 44 may provide a hosting environment for VM 40. NVC 44 may provide execution support to VM 40 similar to an operating system hosting process. NVC 44 may also serve as a protective barrier, monitoring interactions between VM 40 and other network elements, for example, restricting the interactions to those that are deemed safe.

In various embodiments, NVC 44 may secure VM 40 in cloud extension 14. If VM 40 were to run directly on top of the cloud infrastructure, any external entity (e.g., external to enterprise network 12) may communicate with it, thus reducing security. NVC 44 may ensure that components of enterprise network 12 can securely communicate with VM 40, for example, by filtering all other traffic. In various embodiments, NVC 44 may filter other traffic by joining the enterprise overlay network built using cVEM 42. For this purpose, NVC 44 may authenticate itself with cVEM 42 and establish a secure tunnel with cVEM 42. VM 40 may communicate with enterprise network 12 using the secure tunnel with cVEM 42.

In various embodiments, NVC 44 may manage VM 40. For example, NVC 44 may launch VM 40 within a container and provide VM management services to cloud manager 36. Managing VMs can include: launching a new VM; starting the VM; stopping the VM; restarting the VM; monitoring the health of the VM; providing resource utilization data relating to the VM; providing console access to the VM (e.g., using a kernel based VM (KVM)-like service); providing a uniform environment (e.g., interface) to the VMs, etc. The architecture of communication system 10 is intended to make the VMs (e.g., VMs 28(1)-28(N), 40(1)-40(P)) portable across multiple networks and cloud providers. For example, NVC 44 can hide the cloud infrastructure from VM 40 and provide a uniform interface for hardware elements like CPU, memory, disk/storage, and network interface.

According to embodiments of communication system NVC 44 can hasten a process of migrating enterprise application workload to cloud extension 14, while providing security for VM 40 running within cloud extension 14. NVC 44 may provide routing transparency while supporting multiple routing domains in the hybrid cloud environment. NVC 44 may be agnostic to operating systems running on VM 40. For example, NVC 44(1) may host VM 40(1) running a Windows operating system and NVC 44(2) may host VM 40(2) running a Linux operating system. NVC 44 can be agnostic to the hypervisor that VM 40 originally ran on within enterprise network 12. NVC 44 may easily support data encryption, for example, because NVC 44 can intercept the storage data paths of VM 40. NVC 44 may provide users with a flexible way to allocate computing resources at cloud extension 14. In some embodiments, NVC 44 may host multiple VMs 40(1)-40(P); in other embodiments, each of NVC 44(1)-44(P) may host a single corresponding one of VMs 40(1)-40(P) (e.g., one-to-one mapping between VM 40 and NVC 44).

Turning to the infrastructure of communication system 10, the network topology can include any number of servers, VMs, DVSs, virtual routers, VSMs, and other nodes interconnected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that the communication system 10 shown in FIG. 1 is simplified for ease of illustration. For example, enterprise network 12 and cloud extension 14 may comprise access switches, aggregation switches, core switches to aggregate and distribute ingress (upstream traffic), and egress (downstream traffic) traffic, etc. A plurality of switches (virtual and/or physical) may be provided at each access, aggregation, and core level to achieve redundancy within enterprise network 12. Further, virtual networks 35 and cloud extension 14 may include elements particular to the type of network services provided; for example, in data centers that provide mass storage, virtual network 35 and cloud extension 14 may include Storage Area Networks (SANs).

The example network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, cloud gateway 20 may be a VM running in enterprise network 12. Cloud gateway 20 may be responsible for establishing secure tunnel 18 for interconnecting components within enterprise network 12 with cloud gateway 22. Cloud gateway 22 may be another VM running in cloud extension 14. Cloud gateway 22 may also be responsible for establishing secure tunnel 18 to connect cloud gateway 20 at enterprise with allocated cloud resources in cloud extension 14. Cloud gateway 22 and cVEM 42 may together form a L2 switch. Each of cloud gateways 20 and 22 may be implemented on servers, switches, or other network elements. As used herein, the term 'network element' is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In various embodiments, secure tunnel 18 may be an L4 Secure Tunnel to connect cloud resources allocated at cloud extension 14 with enterprise network 12. Secure tunnel 18 may be configured to cope with corporate firewall and network address translation (NAT), for example, from the nature of the transport level protocols (e.g. UDP/TCP) and the transport layer ports opened for hypertext transfer protocol (HTTP)/hypertext transfer protocol secure (HTTPS) in the firewall.

Figure 2:
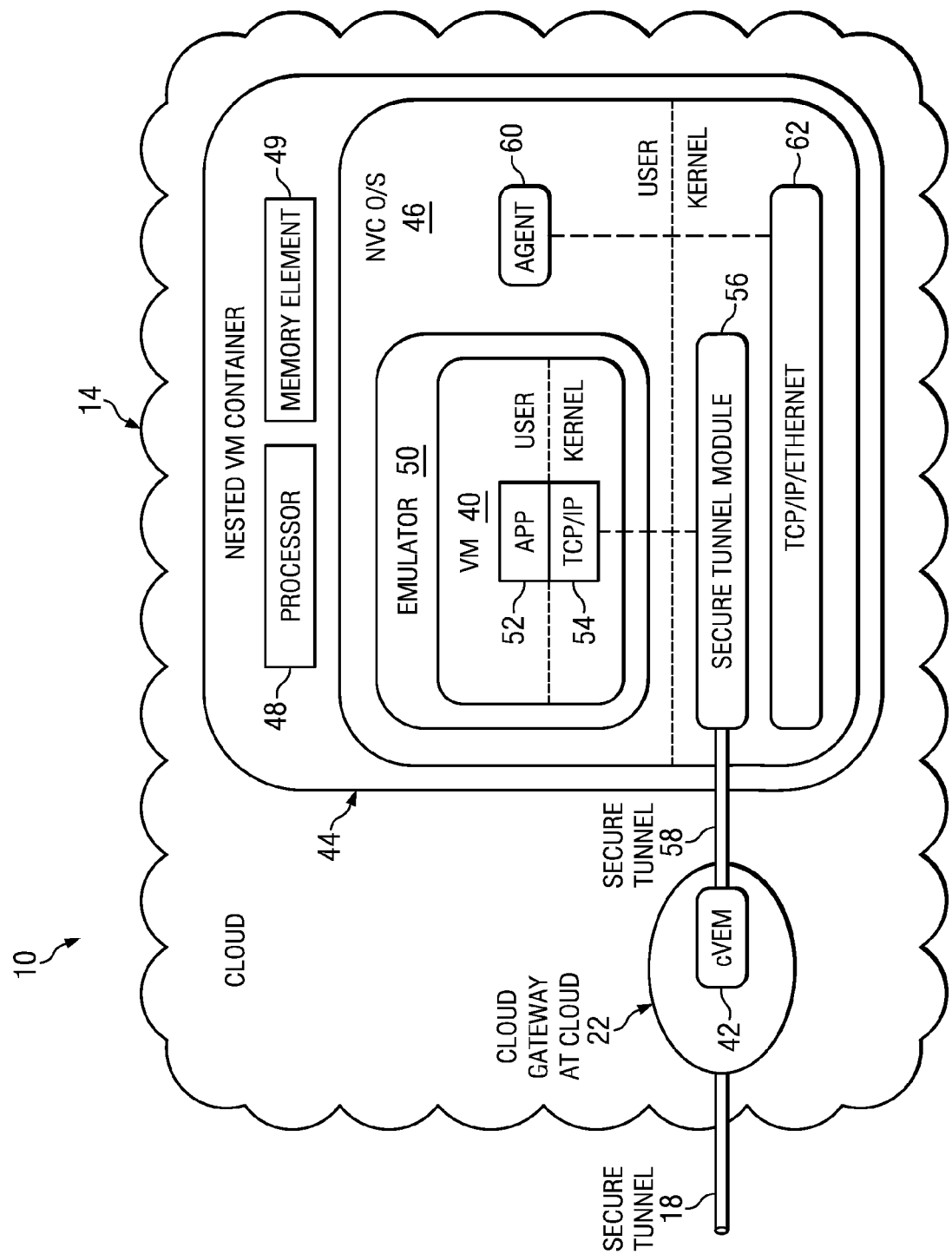
FIG. 2 is a simplified block diagram illustrating example details of the system in accordance with one embodiment.

Turning to FIG. 2, FIG. 2 is a simplified block diagram illustrating example details of an embodiment of communication system 10. NVC 44 in cloud extension 14 may use a NVC operating system (O/S) 46 and include a processor 48 and a memory element 49. In various embodiments, processor 48 and memory element 49 may be part of the cloud infrastructure of cloud extension 14. In some embodiments, processor 48 and memory element 49 may be dedicated for use exclusively by NVC 44. In other embodiments, processor 48 and memory element 49 may be one or more processors and memory elements respectively, that are shared between various other components within cloud extension 14. In yet other embodiments, processor 48 may represent a virtual central processing unit (vCPU) and memory element 49 may represent virtual memory allocated to NVC 44 according to the SLA controlling resource allocation to enterprise network 12 from cloud extension 14.

In various embodiments, NVC O/S 46 may run an emulator 50. Emulator 50 may be configured to enable abstracting the interface provided by NVC 44 to VMs 40(1)-40(P) and running VMs 40(1)-40(P). The abstracted interface may be transparent to the cloud infrastructure of cloud extension 14. In general, "emulators" are hardware or software (or both) that duplicates (i.e., emulates) functions of a first computer architecture in a different second computer architecture, so that the behavior of the second architecture closely resembles the behavior of the first architecture. Emulator 50 may emulate processor functions, storage functions, etc. based on particular needs. In some embodiments, the processor emulation functions may be distinctly implemented from the storage emulation functions. In other embodiments, the processor emulation functions may be integrated with the storage emulation functions.

In an example embodiment, NVC 44 may implement QEMU as emulator 50. QEMU can boot many guest operating systems, including Linux, Solaris, Microsoft Windows, Disk Operating System (DOS), and Berkeley Software Distribution (BSD); and it also supports emulating several hardware platforms, including x86; x86-64; ARM; Alpha; Ethernet, Token Ring, AXis-Code Reduced Instruction Set (ETRAX CRIS); Microprocessor without Interlocked Pipeline Stages (MIPS); MicroBlaze; Performance Optimization With Enhanced RISC-Performance Computing (PowerPC); and Scalable Processor Architecture (SPARC). QEMU can save and restore the state of a VM with all programs running. Guest operating systems of VMs may not be patched to run safely under QEMU. QEMU can also emulate network cards that share the host system's connectivity, for example, by implementing network address translation (NAT), effectively allowing the VM to use the same network as the host. Virtual network cards (vNICs) can also be connected to network cards of other instances of QEMU or local TAP interfaces.

In particular, emulator 50 may include sets of routines in software that emulate a particular platform-specific interface, such as the interface available to VMs in enterprise network 12. For example, emulator 50 can include a hardware abstraction layer between the physical hardware and the software running thereon. Emulator 50 could hide differences in hardware from most of the operating system kernel of the VMs, so that most of the kernel-mode code does not need to be changed to run on systems with different hardware. Emulator 50 may host VM 40 that includes one or more application instances 52 in a user space of the VM operating system, and a TCP/IP stack 54 in a kernel space of the VM operating system.

A secure tunnel module 56 may operate in NVC O/S 46 to enable secure communication of VM 40 with the rest of enterprise network 12. For example, secure tunnel module 56 may authenticate and set up a secure tunnel 58 with cVEM 42. Substantially all communication from and to VM 40 may be routed through secure tunnel 58. NVC 44 may include an agent 60 in NVC O/S 46. Agent 60 may be one or more processes running within NVC O/S 46 and performing various functions, such as mounting cloud storage (if available), monitoring movement of VMs between cloud gateway 22 and cloud storage, receiving files associated with VM 40 from enterprise network 12, configuring VM 40, launching VM 40, managing VM 40, monitoring health of VM 40 and NVC 44, facilitating communication with cloud gateway 22, and such other functions. In various embodiments, agent 60 may function as a conduit between NVC 44 and cloud gateway 22. Agent 60 may also control another TCP/IP/Ethernet stack 62 within NVC O/S 46 to enable communication with components of cloud extension 14 (or other nodes external to enterprise network 12).

Thus, NVC 44 may include dual TCP/IP stacks (e.g., TCP/IP stack 54 and TCP/IP/Ethernet stack 62) for supporting a routing domain for communication with enterprise network 12, and another routing domain for communication with cloud extension 14. Each TCP/IP stack 54 and 62 may have its own routing tables, default gateway, routing caches, and other relevant policies. Such routing transparency can simplify managing the enterprise network configuration, even when enterprise VM resources are migrated from enterprise network 12 to cloud extension 14. In various embodiments, emulator 50 and VM 40 may be implemented in a user space of NVC O/S 46 whereas secure tunnel module 56 and TCP/IP/Ethernet stack 62 may be implemented in a kernel space of NVC O/S 46.

According to embodiments of communication system 10, NVC 44 may be instantiated and may run within cloud extension 14 to facilitate migrating and running VMs 40(1)-40(P) within cloud extension 14. NVC 44 can be equipped with one or more vNICs. In an example embodiment, NVC 44 may create multiple logical vNICs through secure tunnel emulation. NVC 44 may launch and run VMs 40(1)-40(P) within emulator 50 and may provide secure tunnel connection paths (e.g., secure tunnel 58) between NVC 44 and cloud gateway 22. The secure tunnel communication protocol may support formats that allow cloud gateway 22 and NVC 44 to emulate network traffic sent between different vNICs and VEMs within DVS 24.

NVC 44 may hide the cloud infrastructure from VM 40 and provide a uniform interface for elements like CPU, memory, disk/storage, and network interface. For example, while NVC O/S 46 may have to comply with the cloud provider's operating system, NVC 44 may support any O/S running on VM 40. Thus, NVC 44 may be agnostic to whatever operating system is running on VM 40. Moreover, with emulator 50 running VM 40, enterprise IT personnel would merely convert the VM image to a format that is compatible and/or supported with emulator 50. For example, QEMU can run many VM image formats (e.g., VMWare *.vmdk format) directly without any conversion. As used herein, a "VM image" includes a collection of substantially all instances of input/output states (e.g., digital input, output, register, etc.) representing an instantaneous state of processes running in the VM. The VM image may be stored or provided in any suitable file format, including qemu2, raw format (binary), etc. As long as the hypervisor of the cloud provider supports NVC 44, NVC 44 can be used for running VM 40 created by any hypervisor, for example, within enterprise network 12.

Figure 3:
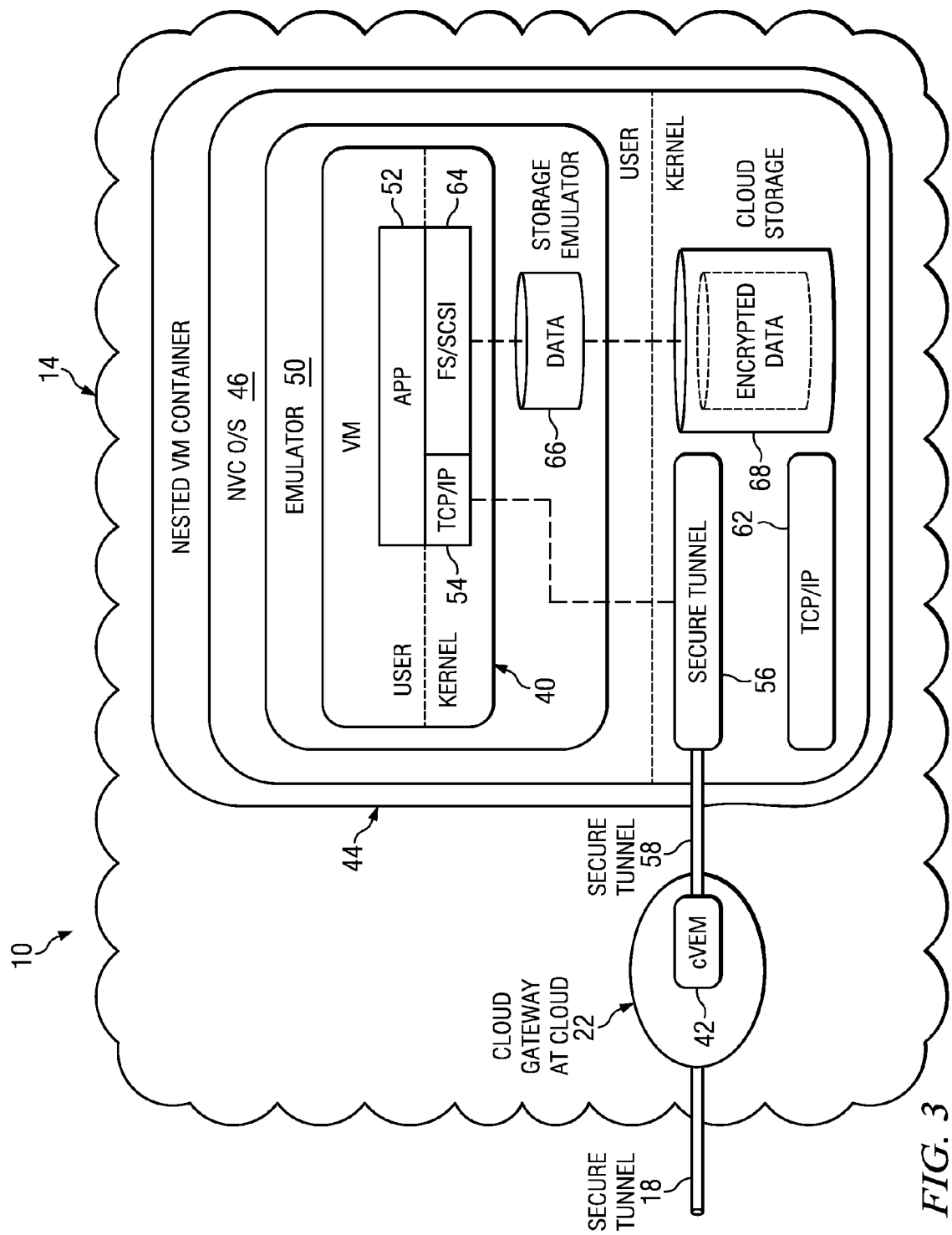
FIG. 3 is a simplified block diagram illustrating other example details of the system in accordance with another embodiment.

Turning to FIG. 3, FIG. 3 is a simplified block diagram illustrating further example details of an embodiment of communication system 10. VM 40 may include a File Server/Small Computer System Interface (FS/SCSI) 64 to enable storing data. A storage emulator 66 in emulator 50 may map FS/SCSI 64 to a cloud storage 68. In the embodiment illustrated in FIG. 3, cloud storage 68 is accessible via NVC O/S 46. For example, cloud storage 69 may include local disk memory allocated by NVC 44 to VM 40. Access to memory may be faster in such cases; however, additional cycles may be drained from NVC 44's CPU. In other embodiments, cloud storage 68 may be located elsewhere in cloud extension 14, and may be accessed by NVC 44 through another FS/SCSI in NVC O/S 46. In such embodiments, the stored data may be available despite any failures (e.g., crashes) of NVC 44. No additional space may be allocated by NVC 44 to store the data. However, there may be a penalty for each read/write access to such cloud storage 68 (e.g., cloud service provider's SLA may specify a cost per read/write access).

Using storage device emulation (e.g., through storage emulator 66), NVC 44 may intercept data from VM 40, relay the data to cloud storage 68, apply an encryption function to the data, and write the encrypted data to cloud storage 68. Cloud storage 68 may be any suitable memory element configured to store data. As used herein, "data" includes any type of numeric, voice, video, or script data, or any type of source or object code, or any other suitable information in any appropriate format that may be communicated from one point to another in electronic devices and/or networks. In the reverse direction, NVC 44 can decrypt encrypted data before fulfilling a read request from VM 40.

Figure 4:
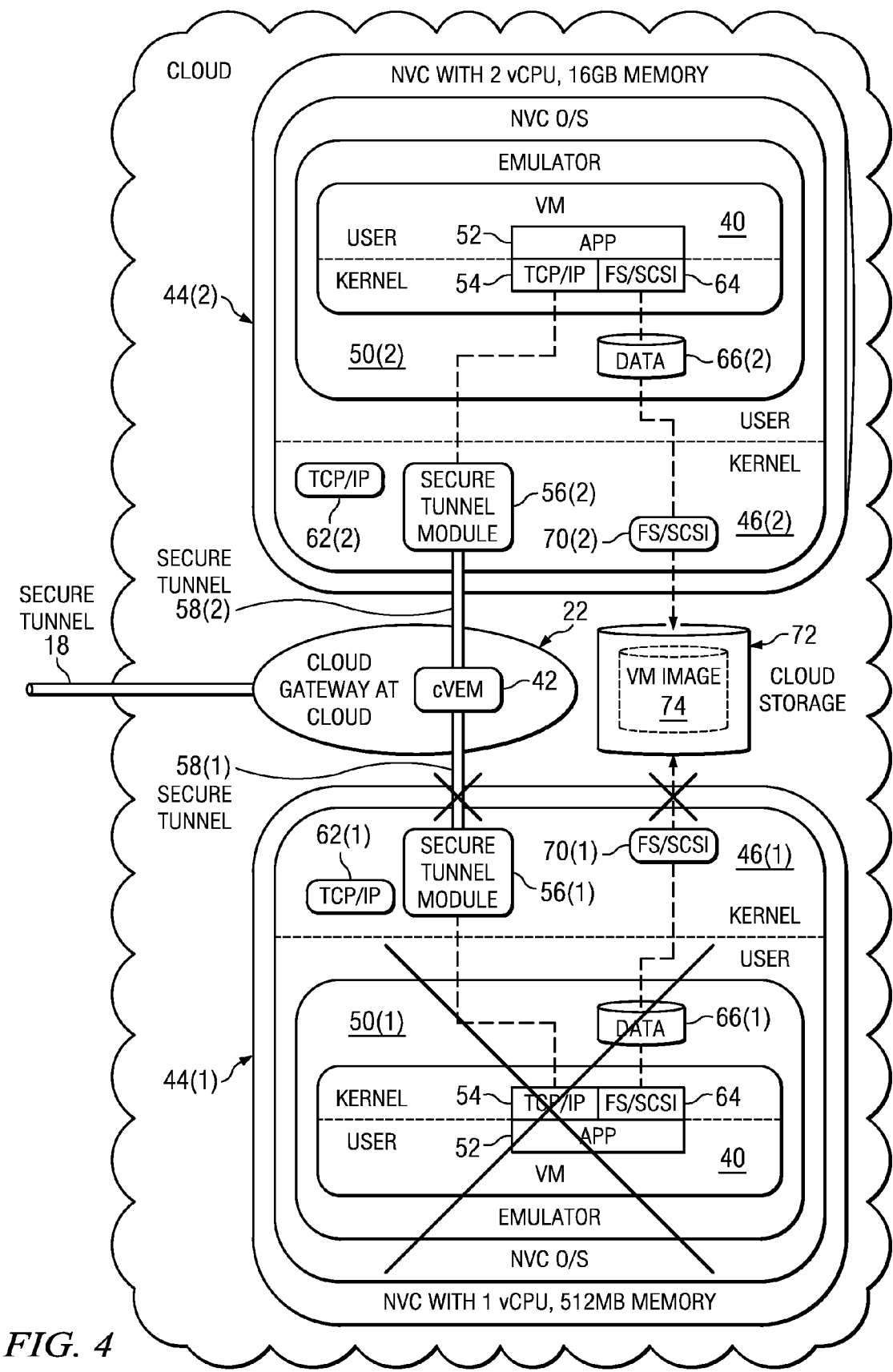
FIG. 4 is a simplified flow diagram illustrating yet other example details of the system in accordance with yet another embodiment of the system.

Turning to FIG. 4, FIG. 4 is a simplified block diagram illustrating further example details of an embodiment of communication system 10. NVC 44(1) may be an instance of NVC 44 in cloud extension 14. NVC 44(1) may be allocated one virtual CPU (vCPU), and 512 MB memory. In one embodiment, the allocation may be according to the SLA controlling the allocation of resources by cloud extension 14 to enterprise network 12. In another embodiment, the allocation may be by cloud manager 36 according to partitioning of allocated cloud infrastructure by network administrators in enterprise network 12. NVC 44(1) may include NVC O/S 46(1), which may run emulator 50(1), which in turn hosts VM 40. VM 40 may include applications 52 in its user space, and TCP/IP stack 54 and FS/SCSI 64 in its kernel space. Storage emulator 66(1) in emulator 50(1) may facilitate intercepting data from FS/SCI 64 in VM 40 and relaying the data to cloud storage 72 via FS/SCSI 70(1) in NVC 44(1). NVC 44(1) may include TCP/IP stack 62(1) for communication with cloud extension 14 and secure tunnel module 56(1) to enable secure communication between cVEM 42 and VM 40 over secure tunnel 58(1).

A change (e.g., upgrade or downgrade) of computing resources for VM 40 may be effected in communication system 10 by providing for another NVC 44(2) at cloud extension 14. NVC 44(2) may have different processing resources compared to NVC 44(1). Processing resources include compute and memory resources (e.g., processor 48, memory element 49, etc.) For example, NVC 44(2) may be allocated 2 vCPUs and 16 GB of memory. According to embodiments of communication system 10, NVC 44(2) may be instantiated and VM 40 may be re-launched on NVC 44(2). "Instantiating" can refer to creating an instance of a process or object (e.g., instance of NVC 44), by for example, defining parameters associated with a process (or object, class, etc.), locating the process (or object, class, etc.) in some physical space (e.g., memory element), running an executable file associated with the process (or object, class, etc.), and such other activities.

A VM image 74 of VM 40 may be stored at cloud storage 72, such that VM image 74 may be accessed by multiple VMs within cloud extension 14, or from outside NVC 44(1). VM image 74 may be stored in any suitable format (e.g., qcow2 format, raw (e.g., binary) format, etc.) based on particular needs. Thereafter, VM 40 in NVC 44(1) may be shut down. NVC 44(2) may be instantiated and cloud storage 72 may be mounted thereto (e.g., using suitable commands such as mount [VM image], etc.). NVC 44(2) may include in a kernel space of NVC O/S 46(2), TCP/IP stack 62(2) for communicating with cloud extension 14 and FS/SCSI 70(2) to access (e.g., read from, write to) cloud storage 72. In its user space, NVC O/S 46(2) may run emulator 50(2) with corresponding storage emulator 66(2). VM 40 may be re-launched in emulator 50(2) within NVC 44(2), for example, by accessing VM image 74 from cloud storage 72. VM 40 is thus removed from NVC 44(1) and re-launched in NVC 44(2) with different processing resources. Thus, processing resources available to VM 40 may be changed transparently, for example, without migrating VM 40 from cloud extension 14 to enterprise network 12 and back.

Figure 5:
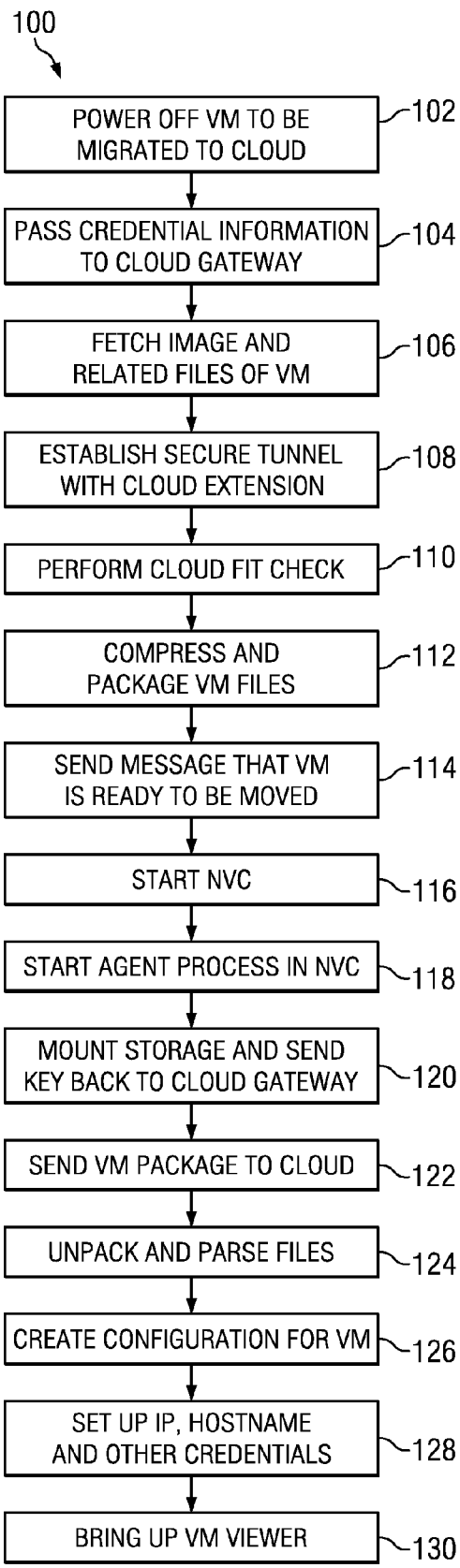
FIG. 5 is a simplified flow diagram illustrating example operations that may be associated with an embodiment of the system.

Turning to FIG. 5, FIG. 5 is a flow diagram illustrating example operational steps associated with migrating VM 40 from enterprise network 12 to cloud extension 14. Operations 100 may begin at 102 with powering off VM 40, which may be migrated to cloud extension 14. At 104, credential information of VM 40 may be passed by cloud manager 36 to cloud gateway 20. Credential information may include information that indicates VM 40's identity and its association with enterprise network 12. At 106, using information provided by cloud manager 36, cloud gateway 20 may fetch VM image and related files of VM 40 from vCenter 32. At 108, cloud gateway 20 may establish secure tunnel 18 with cloud extension 14. At 110, cloud gateway 20 may perform a cloud fit check to validate if VM 40 can be moved to cloud extension 14.

At 112, VM files may be compressed and packaged. For example, VMWare may include files such as *.vmx, *.vmxf, *.vmtx (e.g., for templates), etc. In some embodiments, files (e.g., *.vm(t)x files) that include substantially all the configuration information (e.g., MAC address, and universally unique identifier (UUID), etc.) that could be used by emulator 50 may be compressed and packaged. In other embodiments, substantially all files associated with VM 40 may be compressed and packaged. In an example embodiment, VMware's .vmdk can be converted to a qcow2/raw format and used as the VM image using the following command: qemu-img convert guest-flat.vmdk -O qcow2kraw> guest-flat.img. A raw format is a plain binary of a disk image and may be more portable than other formats. After the VM images are converted to raw format files, they may be compressed (e.g., gzip compression format) before being sent across to cloud extension 14. At 114, a message may be sent from cloud gateway 20 to cloud gateway 22 that VM 40 is ready to be moved. In some embodiments, a particular template for starting NVC 44 may also be provided at this stage.

At 116, NVC 44 may be started. At 118, suitable agent processes (e.g., by agent 60) may be started in NVC 44. At 120, agent 60 may mount cloud storage 72 and send a key (e.g., for authentication purposes) back to cloud gateway 20. Cloud gateway 20 may send the VM package (e.g., compressed files associated with VM 40) to NVC 44 at 122. At 124, agent 60 may unpack and parse the files. At 126, agent 60 may create a configuration for VM 40 from VM image and configuration files accessed from mounted cloud storage 72. In one embodiment, a profile for VM 40 may be extracted from the configuration files, and applicable fields may be translated and converted to a format understood by emulator 50. In some embodiments, console details may be sent to cloud manager 36. At 128, VM 40 may set up a IP address, host name and other credentials. At 130, cloud manager 36 may bring up a VM viewer with the IP address of NVC 44, and manage VM 40 through the VM viewer, as desired. Cloud manager 36 may provide a management interface to monitor instantiated VM resources.

Figure 6:
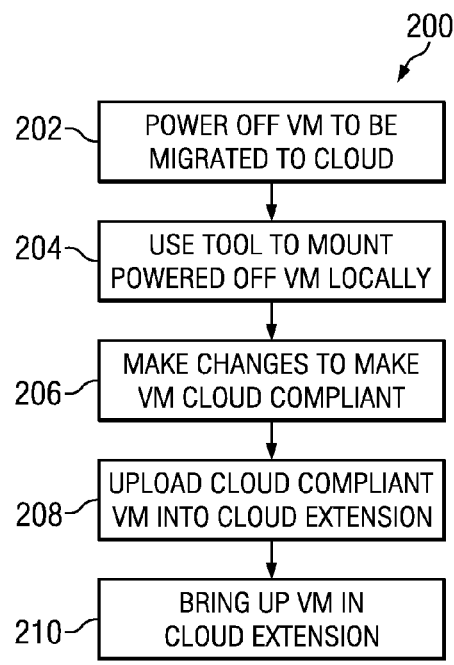
FIG. 6 is a simplified flow diagram illustrating other example operations that may be associated with another embodiment of the system.

Turning to FIG. 6, FIG. 6 is a simplified flow diagram describing a generic tool and procedure for migrating VMs from enterprise network 12 to cloud extension 14. VMs (e.g., 28(1)-28(N)) in enterprise network 12 may operate on various operating systems, for example, Linux and Windows, which may or may not be compatible with operating systems and processing resources provided by cloud extension 14. Operations 200 may include powering off VM 40 to be migrated to cloud extension 14 at 202. At 204, using disk utilities and other similar utilities provided by the enterprise virtualization environment (such as VMware), VM 40 may be mounted locally in enterprise network 12. Step 204 may be complex as it could involve several kinds of operating systems vendors (e.g., RHAT, Fedora, CentOS) and each of such operating system may have a different way of partitioning the corresponding file system. According to embodiments of communication system 10, a root file system and boot partition may be automatically determined at 204.

At 206, suitable changes may be made to VM 40 to make it cloud compliant. Changes may include, by way of examples, and not as limitations, certain version changes of kernel, driver, or configuration to make VM 40 compatible with the cloud provider's environment, and changes to VM 40 to enable compatibility between VM 40 and cloud gateway 22. At 208, VM 40 may be uploaded into cloud extension 14, and at 210, VM 40 may be brought up (e.g., started) in cloud extension 14. Operations 200 may enable automatic migration of VM 40 without user intervention.

Figure 7:
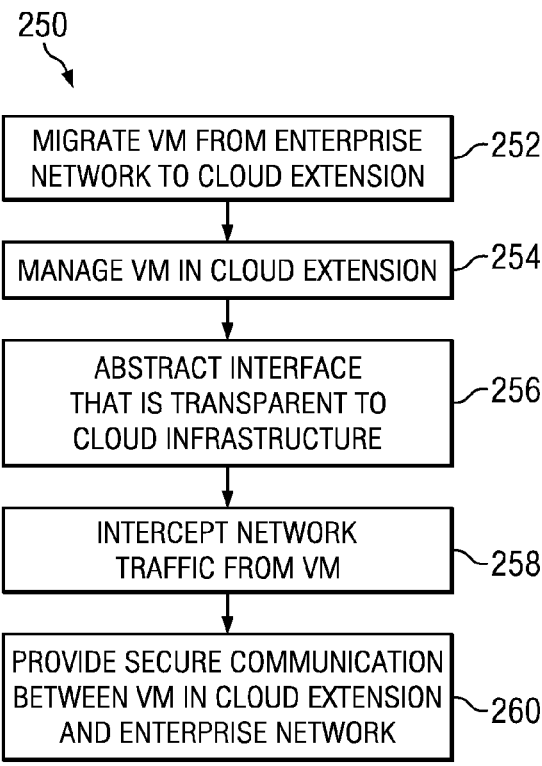
FIG. 7 is a simplified flow diagram illustrating yet other example operations that may be associated with another embodiment of the system.

Turning to FIG. 7, FIG. 7 is a simplified flow diagram illustrating example operations that may be associated with embodiments of communication system 10. Operations 250 may include migrating VM 40 from enterprise network 12 to cloud extension 14 at 252. At 256, agent 60 in NVC 44 may manage VM 40 in cloud extension 14. At 256, emulator 50 may abstract an interface that is transparent to the cloud infrastructure for VM 40. At 258, agent 60 may intercept network traffic from VM 40. At 260, agent 60 may provide secure communication between VM 40 in cloud extension 14 and enterprise network 12. For example, agent 60 may cause NVC 44 to be authenticated to cVEM 42, and secure tunnel 58 may be established between cVEM 42 and VM 40. Secure tunnel 58 may enable communication between VM 40 and enterprise network 12 while filtering communication from other nodes (e.g., in cloud extension 14 or Internet 16).

Figure 8:
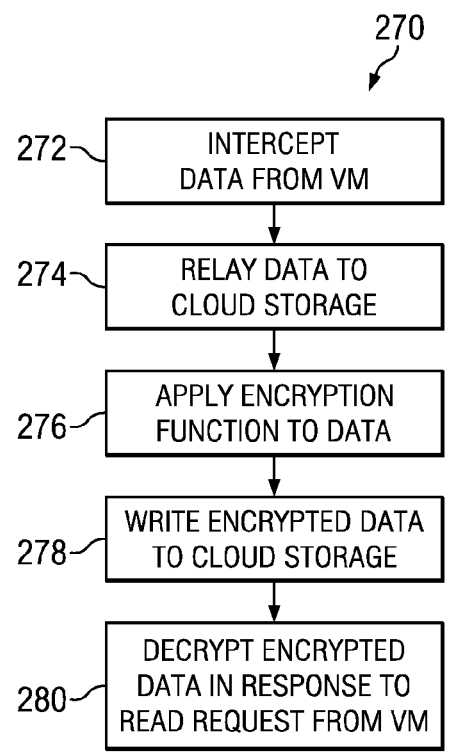
FIG. 8 is a simplified flow diagram illustrating yet other example operations that may be associated with another embodiment of the system.

Turning to FIG. 8, FIG. 8 is a simplified flow diagram illustrating example storage operations that may be associated with NVC 44. Operations 270 may include intercepting data from VM 40 at 272. Data may be intercepted through storage emulator 66 in emulator 50. At 274, data may be relayed to cloud storage 68. At 276, agent 60 may apply an encryption function to data, for example, to encrypt the data before storing in cloud storage 68. At 278, the encrypted data may be written to cloud storage 68. At 280, the encrypted data may be decrypted by agent 60 in response to a read request from VM 40.

Figure 9:
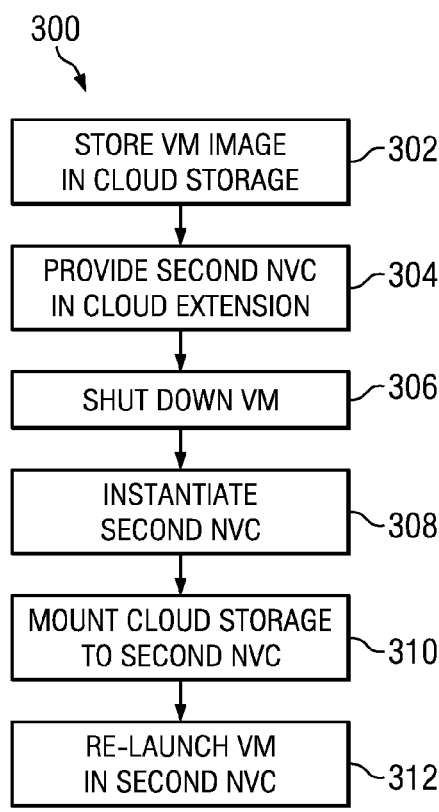
FIG. 9 is a simplified flow diagram illustrating yet other example operations that may be associated with another embodiment of the system.

Turning to FIG. 9, FIG. 9 is a simplified flow diagram illustrating example operations related to flexible provisioning of resources in cloud extension 14. Operations 300 may include storing VM image 74 in cloud storage 72 at 302. At 304, a second NVC (e.g., NVC 44(2)) may be provided in cloud extension 14. At 306, VM 40 may be shut down. At 308, the second NVC (e.g., NVC 44(2)) may be instantiated. At 310, cloud storage 72 may be mounted to the second NVC. At 312, VM 40 may be re-launched in the second NVC.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an "application" as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, NVC 44, and cloud manager 36. In some embodiments, one or more of these features may be implemented in hardware, provided external to these elements, or consolidated in any appropriate manner to achieve the intended functionality. The various network elements (e.g., cloud manager 36, cloud gateways 20, 22, and NVC 44) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, cloud manager 36, cloud gateways 20, 22, and NVC 44 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 49, cloud storage 68, 72) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., 48) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory element 49, cloud storage 68, 72) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
  managing a virtual machine (VM) in a cloud extension, wherein the VM communicates with a part of a distributed virtual switch (DVS) of an enterprise network, wherein the DVS extends into the cloud extension through a virtual interface of the DVS in the cloud extension;
  abstracting an interface that is transparent to a cloud infrastructure of the cloud extension with a nested VM container (NVC) in the cloud extension such that the VM executes in the NVC irrespective of hardware and operating system of the cloud infrastructure, wherein the NVC hosts the VM in the cloud extension and facilitates compute, storage and networking services for the VM over a network overlay using emulation techniques;
  authenticating the NVC with the virtual interface of the DVS in the cloud extension to establish a secure tunnel between the VM and the virtual interface of the DVS through the NVC;
  intercepting, by the NVC, network traffic to and from the VM; and filtering out, by the NVC, network traffic to the VM from outside the enterprise network.

2. The method of claim 1, wherein the cloud extension comprises the NVC that includes:
an emulator configured to enable abstracting the interface; and
dual transmission control protocol/Internet Protocol (TCP/IP) stacks for supporting a first routing domain for communication with the cloud extension, and a second routing domain for communication with the enterprise network.

3. The method of claim 2, wherein the NVC is agnostic with respect to operating systems running on the VM.

4. The method of claim 2, wherein the NVC is agnostic with respect to a hypervisor on which the VM was previously hosted.

5. The method of claim 2, further comprising:
storing a VM image of the VM in a cloud storage in the cloud extension, wherein the cloud storage is accessible from outside the NVC;
providing an additional NVC at the cloud extension, wherein the additional NVC has different processing resources compared to the NVC;
instantiating the additional NVC;
mounting the cloud storage to the additional NVC; and
re-launching the VM on the additional NVC.

6. The method of claim 1, wherein the managing comprises a selected one of a group of activities, the group consisting of:
a) launching the VM,
b) starting the VM,
c) stopping the VM,
d) restarting the VM,
e) monitoring a health of the VM,
f) providing a resource utilization data associated with the VM, and
g) providing a console access to the VM.

7. The method of claim 1, further comprising:
migrating the VM from the enterprise network to the cloud extension, wherein the migrating comprises:
establishing, at the enterprise network, a secure tunnel with the cloud extension;
transferring files associated with the VM from the enterprise network to an agent process running in the cloud extension; and
configuring the VM in the cloud extension.

8. The method of claim 1, further comprising:
intercepting data from the VM;
relaying the data to a cloud storage in the cloud extension;
encrypting the data to generate encrypted data; and
writing the encrypted data to the cloud storage.

9. The method of claim 8, further comprising:
decrypting the encrypted data in response to a read request from the VM.

10. The method of claim 1, further comprising:
providing a secure tunnel between the VM and a cloud gateway located in the cloud extension.

11. Logic encoded in non-transitory media that includes instructions for execution and when executed by a processor, is operable to perform operations comprising:
managing a VM in a cloud extension, wherein the VM communicates with a part of a DVS of an enterprise network, wherein the DVS extends into the cloud extension through a virtual interface of the DVS in the cloud extension;
abstracting an interface that is transparent to a cloud infrastructure of the cloud extension with a NVC in the cloud extension such that the VM executes in the NVC irrespective of hardware and operating system of the cloud infrastructure, wherein the NVC hosts the VM in the cloud extension and facilitates compute, storage and networking services for the VM over a network overlay using emulation techniques;
authenticating the NVC with the virtual interface of the DVS in the cloud extension to establish a secure tunnel between the VM and the virtual interface of the DVS through the NVC;
intercepting, by the NVC, network traffic to and from the VM; and
filtering out, by the NVC, network traffic to the VM from outside the enterprise network.

12. The logic of claim 11, wherein the cloud extension comprises the NVC that includes:
an emulator configured to enable abstracting the interface; and
dual TCP/IP stacks for supporting a first routing domain for communication with the cloud extension, and a second routing domain for communication with the enterprise network.

13. The logic of claim 12, the operations further comprising:
storing a VM image of the VM in a cloud storage in the cloud extension, wherein the cloud storage is accessible from outside the NVC;
providing an additional NVC at the cloud extension, wherein the additional NVC has different processing resources compared to the NVC;
instantiating the additional NVC;
mounting the cloud storage to the additional NVC; and
re-launching the VM on the additional NVC.

14. The logic of claim 11, the operations further comprising:
migrating the VM from the enterprise network to the cloud extension, wherein the migrating comprises:
establishing, at the enterprise network, a secure tunnel with the cloud extension;
transferring files associated with the VM from the enterprise network to an agent process running in the cloud extension; and
configuring the VM in the cloud extension.

15. The logic of claim 11, the operations further comprising:
intercepting a data from the VM;
relaying the data to a cloud storage in the cloud extension;
encrypting the data to generate encrypted data; and
writing the encrypted data to a memory element.

16. An apparatus, comprising:
a memory element for storing data; and
a processor that executes instructions associated with the data, wherein the processor and the memory element cooperate, such that the apparatus is configured for:
managing a VM in a cloud extension, wherein the VM communicates with a part of a DVS of an enterprise network, wherein the DVS extends into the cloud extension through a virtual interface of the DVS in the cloud extension;
abstracting an interface that is transparent to a cloud infrastructure of the cloud extension with a NVC in the cloud extension such that the VM executes in the NVC irrespective of hardware and operating system of the cloud infrastructure, wherein the NVC hosts the VM in the cloud extension and facilitates compute, storage and networking services for the VM over a network overlay using emulation techniques;

authenticating the NVC with the virtual interface of the DVS in the cloud extension to establish a secure tunnel between the VM and the virtual interface of the DVS through the NVC;

intercepting, by the NVC, network traffic to and from the VM; and filtering out, by the NVC, network traffic to the VM from outside the enterprise network.

17. The apparatus of claim 16, wherein the cloud extension comprises the NVC that includes:

an emulator configured to enable abstracting the interface; and dual TCP/IP stacks for supporting a first routing domain for communication with the cloud extension, and a second routing domain for communication with the enterprise network.

18. The apparatus of claim 17, wherein the apparatus is further configured for:

storing a VM image of the VM in a cloud storage in the cloud extension, wherein the cloud storage is accessible from outside the NVC;

providing an additional NVC at the cloud extension, wherein the additional NVC has different processing resources compared to the NVC;

instantiating the additional NVC;

mounting the cloud storage to the additional NVC; and re-launching the VM on the additional NVC.

19. The apparatus of claim 16, wherein the apparatus is further configured for:

migrating the VM from the enterprise network to the cloud extension, wherein the migrating comprises:

establishing, at the enterprise network, a secure tunnel with the cloud extension;

transferring files associated with the VM from the enterprise network to an agent process running in the cloud extension; and configuring the VM in the cloud extension.

20. The apparatus of claim 16, wherein the apparatus is further configured for:

intercepting a data from the VM;

relaying the data to a cloud storage in the cloud extension;

encrypting the data to generate encrypted data; and writing the encrypted data to another memory element.

* * * * *